United States Patent Office 3,226,187
Patented Dec. 28, 1965

3,226,187
METHOD OF OBTAINING INSOLUBLE BASIC ALUMINUM AMMONIUM ALUM
Stanislaw Bretsznajder, Wieslaw Kawecki, Janusz Porowski, and Jan Lis, Warsaw, Poland, assignors to Instytut Chemii Ogolnej, Warsaw, Poland
No Drawing. Filed July 3, 1962, Ser. No. 207,379
Claims priority, application Poland, July 14, 1961, P 96,952
1 Claim. (Cl. 23—118)

It has hitherto been known to obtain water insoluble basic aluminum ammonium alum of the formula $(NH_4)_2SO_4 \cdot 3Al_2(OH)_4SO_4$ from aluminum raw materials containing a great quantity of silica e.g. from clay, kaolin, shales, fly ash, ash etc., by decomposing the said raw materials by means of sulphuric acid, separating the insoluble parts, adding ammonium sulphate, crystallizing the ammonium alum of a formula $$(NH_4)_2SO_4 \cdot Al_2(SO_4)_3 \cdot 24H_2O$$

and finally separating the product by hydrolizing this alum at increased temperature. The hydrolysis lye which apart from the rest of the monhydrolyzed alum contains hydrolysis by-products (ammonium sulphate and sulphuric acid) is recycled to one of the proceeding stages of the process eventually together with the lye after the aluminum ammonium alum crystallization, e.g. is mixed with sulphuric acid and is returned to the decomposition of the raw-material containing aluminum.

A drawback of the described method is the relatively small yield from the hydrolysis of the alum which generally does not exceed 50%. This means that about a half of the alum which has been used in the hydrolysis remains in the hydrolysis lye. Such a great concentration of the aluminum salt in the solution used for the decomposition of the aluminum raw material decreases by buffering action the velocity of the decomposition of this raw material by the sulphuric acid and thus detrimentally influences the yield of the decomposition.

It has been found that both the drawbacks can be eliminated to a great extent if according to the invention ammonium sulphate is not fed to the crystallization of the aluminum ammonium alum but rather at various places in the system sulphuric acid and gaseous ammonia or water-dissolved ammonia are separately fed in. Both these components are introduced in quantities at least equal to those contained in the basic aluminum ammonium alum which have been removed from the system. According to the invention not neutral but basic alum is subjected to hydrolysis. Namely, the ammonia is introduced into the alum solution prior to the hydrolyzing process. As it is known, the aluminum ammonium alum solution $(NH_4)_2SO_4 \cdot Al_2(SO_4)_3$ aq. contains components of this compound i.e. aluminum and ammonium sulphates. The aluminum sulphate with ammonia produces basic soluble salts, e.g. the well-known basic sulphate of the formula $Al(OH)SO_4$ and corresponding to it soluble basic aluminum ammonium alum of the formula $(NH_4)_2SO_4 \cdot 2Al(OH)SO_4$ aq. The soluble basic aluminum ammonium alum at an increased temperature hydrolzyes quicker with a higher yield than the neutral alum. The yield of the hydrolyzing process is increased considerably, on an average from 50% to about 70%. Due to this fact the hydrolysis lye which has been returned to one of the preceding phases of the process contains considerably less aluminum salt. A part of the sulphuric acid commonly added in form of ammonium sulphate in order to replace the losses is, according to the invention, introduced into the decomposing process of the raw material, in the form of acid. Due to both these factors (decrease of the concentration of the aluminum salt and increase of the concentration of the sulphuric acid in the reactor of the decomposition of the raw material), the course of this decomposition is accelerated and its yield is increased.

*Example.*—The process of obtaining basic aluminum ammonium sulphate from clay calcined at a temperature 720° C. and ground, containing 23.6% $Al_2O_3$, was carried out in two different ways, that is according to the known method consisting of adding ammonium sulphate to the crystallization of alum and according to the method of the invention in which instead of ammonium sulphate, sulphuric acid and ammonia are introduced to the circulation in two different phases of the process, and basic soluble aluminum alum is subjected to hydrolysis.

I. According to the known method, the decomposition of calcinated clay in a solution containing 18.4% by weight of $H_2SO_4$ and 2.1% by weight of $Al_2O_3$ (in form of alum) was carried out at a temperature of 100° C. for 3 hours and a half, the resultant yield of the extraction of $Al_2O_3$ being 82.0% of the theoretical yield. After the hot filtration of silica and of non-decomposed clay, ammonium sulphate was added to the filtrate in a quantity theoretically necessary to convert aluminum sulphate into aluminum ammonium alum. After cooling the solution to a temperature of 24° C. the aluminum ammonium alum crystallized with the yield of 78.9% of the theoretical yield. After centrifugation, the alum, molten in its own crystallization water, was heated in an autoclave to a temperature of 186° C. After 1 hour it was cooled to a temperature of 100° C. and the separated basic aluminum ammonium alum was filtered off. The yield of the hydrolysis was 51.3%.

II. According to the invention, the decomposition of calcinated clay was carried out by means of the lyes resulting from the crystalization of the alum and from the hydrolysis of the crystallized alum.

To these lyes, apart from the sulphuric acid in an amount as in Example I, also an amount of acid equivalent to that of the ammonium sulphate applied in the Example I at the crystallization of alum was added. The solution used for the decomposition of clay contained 20.1% of $H_2SO_4$ and 1.6% of $Al_2O_3$ (in form of alum). In extracting, which was carried out within 3 hours, at a temperature of 100° C., an extraction yield of 85.8% of the theoretical yield was obtained.

After the insoluble parts had been filtered off, the aluminum ammonium alum was crystallized by cooling the filtrate to a temperature of 23° C. The yield of the crystallization obtained was 79.4%. The alum $$(NH_4)_2SO_4 \cdot Al_2(SO_4)_3 \cdot 24H_2O$$

was molten in its own crystallization water and was partly converted in a solution of soluble basic aluminum ammonium alum $(NH_4)_2SO_4 \cdot 2Al(OH)SO_4$ by adding gaseous ammonia in a quantity equivalent to that which was contained in the insoluble basic aluminum ammonium alum $(NH_4)_2SO_4 \cdot 3Al_4(OH)_4SO_4$, precipitated in the hydrolyzing process. Subsequently the solution was heated for 1 hour in an autoclave to a temperature of 184° C. and cooled to a temperature of 100° C., whereupon the precipitated insoluble basic aluminum ammonium alum was filtered off. The yield of the hydrolysis was 68.4%, hence it was greater by about ⅓ than that obtained by the known method.

What we claim is:

In the process for producing insoluble basic aluminum ammonium alum $(NH_4)_2SO_4 \cdot 3Al_2(OH)_4SO_4$ from raw materials containing in addition to aluminum, a substantial amount of silica, which process comprises:
(A) decomposing the said raw material by treating with a solution which is a mixture of (1) sulphuric acid, (2) the lye obtained from the crystallization of the alum prior to hydrolysis, and (3) the lye obtained from the hydrolysis of the crystallized alum;

(B) separating the insoluble matter from the decomposition product to obtain a solution;

(C) crystallizing the aluminum ammonium alum from the solution; and (D) hydrolyzing a solution of the thus obtained crystallized aluminum ammonium alum to obtain insoluble basic aluminum ammonium alum; the improvement which comprises adding sulphuric acid to the solution utilized to decompose the raw material and adding ammonia to the solution of aluminum ammonium alum at a time between the start of the hydrolysis of the aluminum ammonium alum and the completion of said hydrolysis, the amounts of the sulphuric acid and ammonia added being in an amount at least equivalent to the amount removed from the reaction system through the removal of the insoluble basic aluminum ammonium alum.

References Cited by the Examiner

FOREIGN PATENTS 25,683  9/1903  Great Britain.
of 1902

MAURICE A. BRINDISI, *Primary Examiner.*